United States Patent [19]

Ault et al.

[11] Patent Number: 5,396,513
[45] Date of Patent: Mar. 7, 1995

[54] METAL VAPOR LASER INCLUDING HOT ELECTRODES AND INTEGRAL WICK

[75] Inventors: Earl R. Ault, Livermore; Terry W. Alger, Tracy, both of Calif.

[73] Assignee: The United States of America as represented by the United States Department of Energy, Washington, D.C.

[21] Appl. No.: 158,885

[22] Filed: Nov. 29, 1993

[51] Int. Cl.⁶ .............................. H01S 3/03
[52] U.S. Cl. ........................ 372/56; 372/34; 372/61
[58] Field of Search ............. 372/56, 61, 34, 55

[56] References Cited

U.S. PATENT DOCUMENTS

| | | | |
|---|---|---|---|
| 3,654,567 | 4/1972 | Hodgson | 372/56 |
| 3,863,178 | 1/1975 | Ferrar | 372/56 |
| 4,442,523 | 4/1984 | Bricks | 372/56 |
| 4,761,792 | 8/1988 | Maitland | 372/56 |
| 4,956,845 | 9/1990 | Otto et al. | 372/56 |
| 4,961,199 | 10/1990 | Duncan et al. | 372/56 |
| 5,148,440 | 9/1992 | Duncan | 372/56 |

Primary Examiner—Rodney B. Bovernick
Assistant Examiner—Hemang Sanghavi
Attorney, Agent, or Firm—Miguel A. Valdes; Roger S. Gaither; William R. Moser

[57] ABSTRACT

A metal vapor laser, specifically one utilizing copper vapor, is disclosed herein. This laser utilizes a plasma tube assembly including a thermally insulated plasma tube containing a specific metal, e.g., copper, and a buffer gas therein. The laser also utilizes means including hot electrodes located at opposite ends of the plasma tube for electrically exciting the metal vapor and heating its interior to a sufficiently high temperature to cause the metal contained therein to vaporize and for subjecting the vapor to an electrical discharge excitation in order to lase. The laser also utilizes external wicking arrangements, that is, wicking arrangements located outside the plasma tube.

1 Claim, 2 Drawing Sheets

5,396,513

METAL VAPOR LASER INCLUDING HOT ELECTRODES AND INTEGRAL WICK

FIELD OF THE INVENTION

The United States Government has rights in this invention pursuant to Contract No. W-7405-ENG-48 between the United States Department of Energy and the University of California for operation under Lawrence Livermore National Laboratory.

BACKGROUND OF INVENTION

The present invention relates generally to metal vapor lasers and more particularly to specifically designed electrode and wicking arrangements associated with such a laser.

One type of metal vapor laser in the prior art is illustrated in FIG. 1A. This laser which is generally indicated by the reference numeral 10 is shown including a plasma tube 12 which forms part of an overall plasma tube assembly. The plasma tube assembly is not only the tube but also a suitable means not shown for thermally insulating the tube which contains a metal vapor, for example copper vapor in a specific embodiment and buffer gas, for example neon. The laser utilizes means including electrode arrangements 14 and 16 located at opposite ends of the plasma tube for electrically heating the interior of the plasma tube in accordance with the profile illustrated in FIG. 1B. Note specifically from this latter figure that the interior of tube 12 increases in temperature from its left-hand end to a maximum constant temperature over an active intermediate volume within the tube and thereafter decreases to a minimum value at the right-hand end of the tube. The temperature within the active volume of the tube is sufficiently high to cause the metal vapor contained within that volume to vaporize and subsequently be electrically excited by the current passing between the electrode arrangements, whereby to initiate the production of the metal vapor laser beam.

It is to be understood that all of the components of metal vapor laser 10 are not illustrated in FIG. 1A and many of these components will not be discussed here. However, in order to appreciate the present invention, the prior art laser illustrated in FIG. 1A is shown including a pair of wicking arrangements generally indicated at 18 and 20. Note that the two wicking arrangements are located within plasma tube 12 near opposite ends thereof. Specifically, referring to FIG. 1B in conjunction with FIG. 1A, note that the wicking arrangement 18 is located across one bend in the temperature profile of the tubes interior while wicking arrangement 20 is located across the other bend. More specifically, part of wicking arrangement 18 is subjected to the operating temperature within plasma tube 12 while part is subjected to a lower temperature, specifically the temperature below the vaporization temperature of the metal within the tube. This is also true for wicking arrangement 20. Under these conditions, each wicking arrangement serves to capture liquid metal resulting from the condensation of some of the metal vapor escaping from the active volume within tube 12 and causes the liquid metal so captured to be reintroduced into the active volume of the tube and reheated to its vapor state. This wicking process is well-known in the art and will not be described further, except as it relates to the present invention.

As stated above and shown in FIG. 1B, opposite ends of plasma tube 12 are cold, that is, below the vaporization temperature of the metal within the tube. This is because the electrode arrangements 14 and 16 are purposely maintained at cold temperatures, as it has been thought heretofore that the electrodes could not be operated at hot temperatures, specifically temperatures sufficiently high to vaporize the metal used in the plasma tube. As a result, in order to ensure that the wicking arrangements are in part hot and in part cold (which is necessary), heretofore they have had to be placed within the plasma tube in order to meet this condition and thereby function in the intended manner. This has a number of disadvantages. First, the active volume of the plasma tube itself, that is, the volume in which lasing takes place, is substantially shorter than the overall length of the tube. Second, each wick arrangement, because of its position within the plasma tube, takes up optical space that could otherwise be utilized in the production of the laser beam. Third, the wicks are placed directly in a relatively hostile environment whereby electrical discharge can take place in the wick itself. Fourth, the wicks and the liquid copper or other such metal can come in direct contact with the plasma tube, thereby reducing its operating lifetime by chemical degradation and fracturing during temperature cycling. These are some of the disadvantages associated with the prior art type of metal vapor laser illustrated in FIG. 1A.

SUMMARY OF THE INVENTION

It is an object of the present invention to provide a metal vapor laser that does not have the disadvantages recited above.

A more particular object of the present invention is to provide a metal vapor laser in which its electrodes can be operated hot, that is, at temperatures corresponding to the vaporization temperature of the metal used with the laser, and its wicking arrangements can be operated outside its plasma tube whereby to eliminate the disadvantages recited above and other disadvantages associated with internal wicking arrangements.

As will be described in more detail hereinafter, in the metal vapor disclosed herein, which is a copper vapor laser in an actual embodiment, a plasma tube assembly is utilized and includes a thermally insulated plasma tube containing metal vapor and buffer gas therein, in the same manner as prior art laser 10 discussed above. The metal vapor laser disclosed herein also includes electrode and wicking arrangements corresponding in function to electrode and wicking arrangements 14, 16 and 18, 20 forming part of laser 10. However, in accordance with the present invention, the electrode arrangements forming part of the present laser are operated hot and the wicking arrangements are located entirely outside the plasma tube. In a preferred embodiment, the entire internal volume of the plasma tube, from one end to the other, is heated to a sufficiently high temperature to cause the metal vapor contained therein to lase. In this way, for a plasma tube of given length, its output efficiency for a given input is significantly higher than the prior art laser 10 which utilizes only a part of the overall plasma tube in producing its laser beam. Moreover, the wicking arrangements, because they are located outside the plasma tube, can be larger than wicking arrangements 18 and 20 and a greater number of readily available wicking arrangements have been found to be suitable for use with the laser since they are not subjected to such a hostile environment.

Additional objects, advantages and novel features of the present invention will be set forth in part in the description which follows, and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the following description, serve to explain the principles of the present invention.

DETAILED DESCRIPTION OF THE INVENTION

Reference will now be made in detail to a preferred embodiment of the invention, an example of which is illustrated in the accompanying drawings. While the invention will be described in connection with a preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1A:
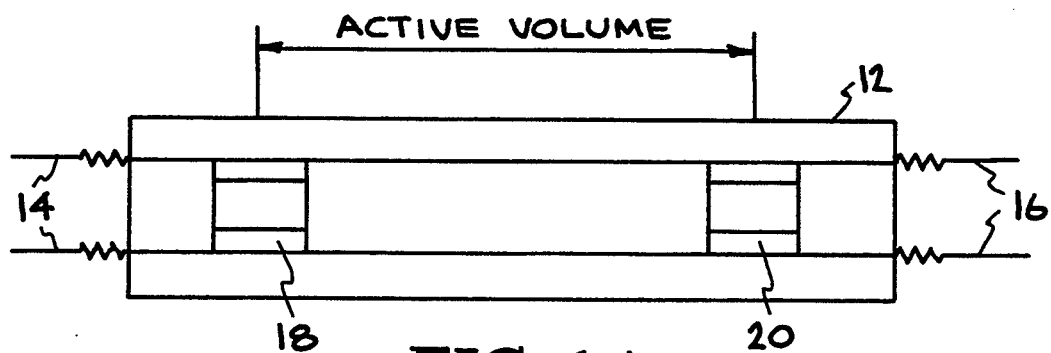
FIG. 1A is a diagrammatic illustration of a prior art type of metal vapor laser.
Figure 1B:
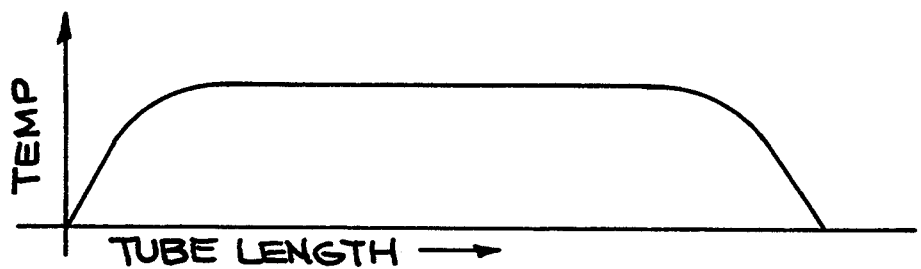
FIG. 1B graphically illustrates an operational feature of the laser shown in FIG. 1A.
Figure 2A:
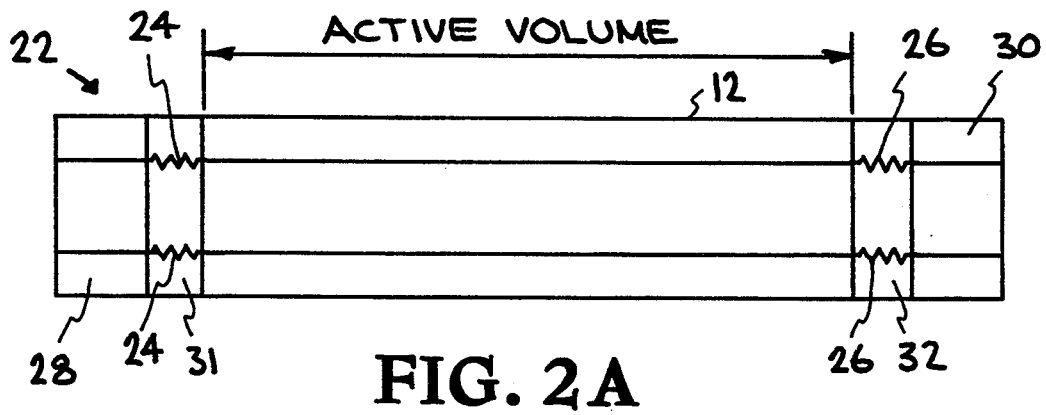
FIG. 2A diagrammatically illustrates a metal vapor laser designed in accordance with the invention.
Figure 2B:
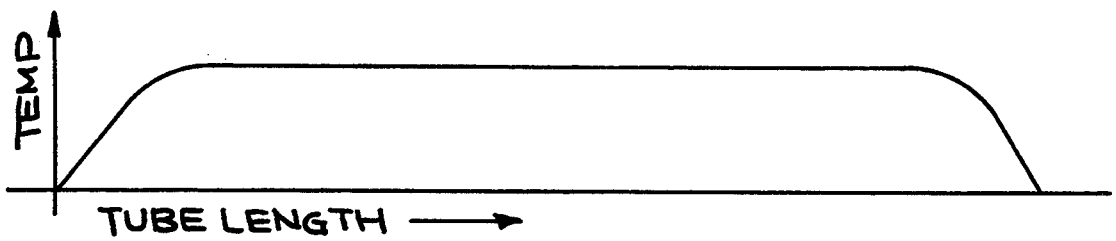
FIG. 2B graphically illustrates an operating feature of the laser shown in FIG. 2A.

Attention is immediately directed to FIGS. 2A and 2B since FIGS. 1A and 1B were discussed above. In FIG. 2A, a metal vapor laser designed in accordance with the present invention is generally indicated by the reference numeral 22. This laser may include the same metal vapor and buffer gas containing plasma tube 12 and associated thermal insulation (not shown) forming part of laser 10. It also includes suitable means including readily available electrodes 24 and 26 located adjacent opposite ends of tube 12 for electrically heating the entire interior volume of tube 12 to a sufficiently high temperature to cause the metal to vaporize and subsequently lase by exciting the vapor with current passing between the electrodes (hereinafter referred to as "electrical discharge excitation"). In other words, the entire interior volume within the plasma tube is operated in an active electrical discharge excitation mode, as illustrated in FIG. 2A. The physics by which electrical discharge excitation of the vapor within tube 12 takes place to cause the vapor to lase at its elevated temperature is well-known in the art and therefore will not be discussed herein.

The heating means forming part of overall laser 22 provides the heating profile illustrated in FIG. 2B. Note how not only the entire interior of the tube 12 is heated to a constant lasing temperature but areas immediately outside opposite ends of the tube are so heated. Beyond these areas, the temperature drops off in the same manner illustrated in FIG. 1B. This is made possible because the electrodes 24 and 26 are operated hot, that is, at the lasing temperature of the metal within tube 12. Laser 22 does require additional insulation 31 and 32 to keep the electrodes hot.

Still referring to FIG. 2A, laser 22 is shown including a pair of wicking arrangements 28 and 30 which correspond in function to wicking arrangements 18 and 20. In addition, arrangements 28 and 30 are disposed temperature-wise at the same points on the temperature profile as arrangements 18 and 20, that is across the knees or bends of the profile. However, in accordance with the present invention, the knees or bends of these profiles are disposed outside tube 12 and therefore the wicking arrangements can be placed outside the tube, as shown in FIG. 2A. This results in the advantages discussed previously.

Figure 3:
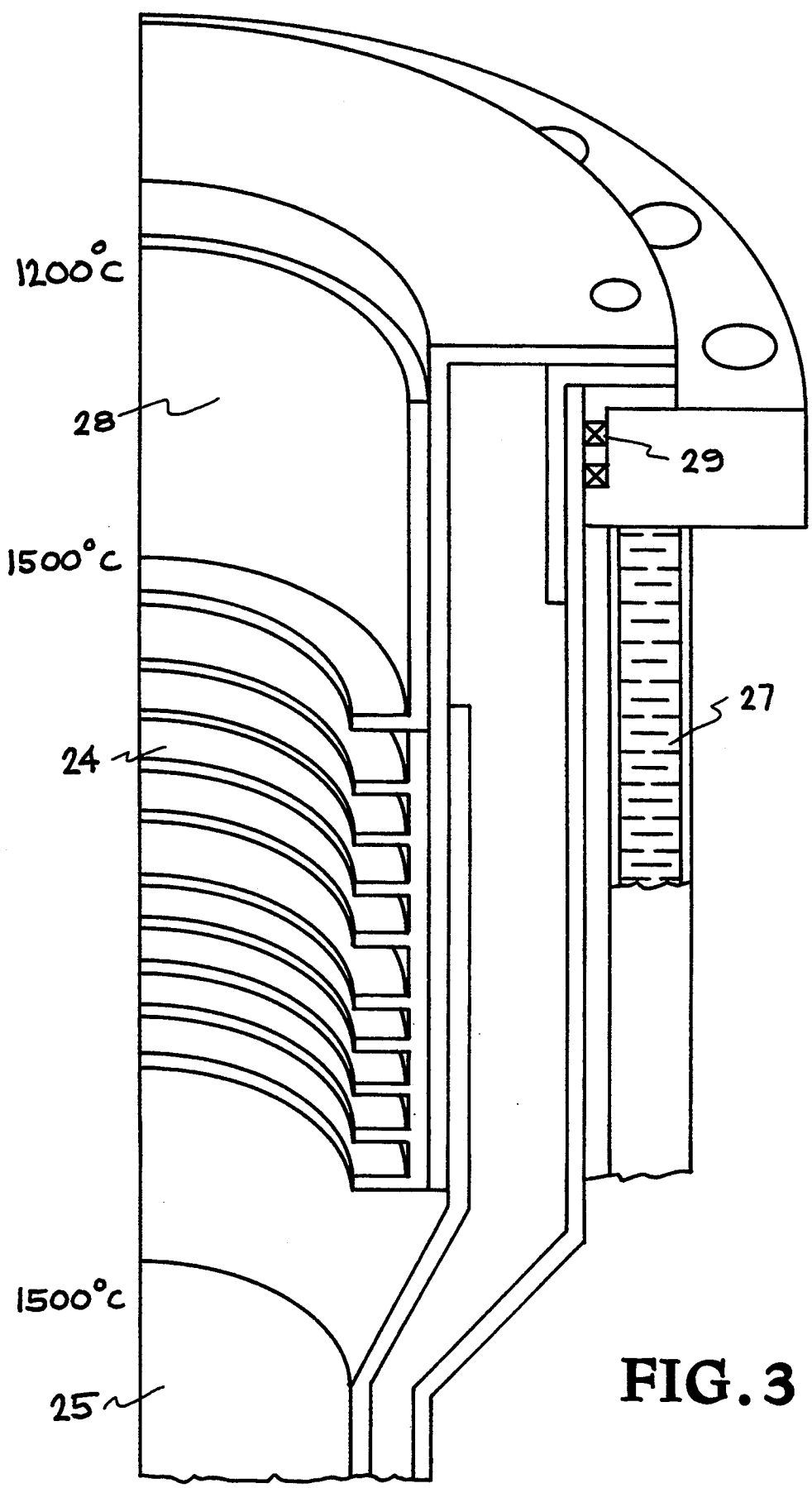
FIG. 3 is a diagrammatic illustration of one end of an actual working metal vapor laser designed in accordance with the present invention.

Turning to FIG. 3, attention is directed to a metal vapor laser designed in accordance with an actual embodiment of the present invention. Note that the various components are so labeled. In this regard, the wick assembly corresponds to the wick arrangements 28; the electrode pack corresponds to an associated electrode arrangement 24 and the neon refers to the buffer gas within the plasma tube 25. In addition, the embodiment illustrated in FIG. 3 illustrates other components including specifically a water cooled jacket assembly 27 serving as a means for supporting the plasma tube, and end seals 29. Further, actual temperature values are exemplified. Note specifically that the electrode pack operates at temperatures exceeding 1500° C., as does one end of the wick assembly. The other end of the wick assembly is operated at temperatures below 1200° C. In the case of a copper vapor laser, the optimum temperature of copper is approximately 1500° C.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

What is claimed is:

1. A metal vapor laser, comprising:
  (a) a thermally insulated plasma tube assembly having first and second opposing ends, said plasma tube containing a particular metal and buffer gas therein;
  (b) electrode means for heating the entire interior volume within said plasma tube to a sufficiently high temperature to cause at least a portion of said metal contained within said heated interior of said plasma tube to vaporize therein, said electrode means also heating areas immediately outside of said plasma tube proximate said first and second opposing ends of said plasma tube, and for generating electrical discharge excitation within said plasma tube such that said vaporized metal is stimulated to lase, thereby producing a metal vapor laser beam, said electrode means operating at said temperature of said vaporized liquid metal; and (c) wicking means located adjacent each of said first and second opposing ends of said plasma tube for capturing liquid metal resulting from the condensation of said vaporized metal escaping from said plasma tube, said wicking means disposed proximate a respective electrode means such that only a portion of said wicking means is heated until said captured liquid metal is reheated to its vapor state by said electrode means and reintroduced into said plasma tube.

* * * * *